US009441640B2

(12) United States Patent
Park et al.

(10) Patent No.: US 9,441,640 B2
(45) Date of Patent: Sep. 13, 2016

(54) PUMP FOR WATER COOLER

(71) Applicant: ZALMAN TECH CO., LTD., Seoul (KR)

(72) Inventors: Sang Woong Park, Gyeonggi-do (KR); Hak Bong Lee, Seoul (KR); Hyun Woo Lee, Seoul (KR)

(73) Assignee: ZALMAN TECH CO., LTD., Seoul (KR)

( * ) Notice: Subject to any disclaimer, the term of this patent is extended or adjusted under 35 U.S.C. 154(b) by 426 days.

(21) Appl. No.: 13/963,302

(22) Filed: Aug. 9, 2013

(65) Prior Publication Data
US 2014/0334921 A1 Nov. 13, 2014

(30) Foreign Application Priority Data
May 10, 2013 (KR) .................. 10-2013-0053396

(51) Int. Cl.
F04D 29/58 (2006.01)
F04D 13/06 (2006.01)

(52) U.S. Cl.
CPC ......... F04D 29/586 (2013.01); F04D 13/0606 (2013.01); *G06F 2200/201* (2013.01)

(58) Field of Classification Search
CPC ............. F04D 29/586; F04D 13/0606; G06F 2200/201
USPC ............................ 415/175; 417/366, 410.1
See application file for complete search history.

(56) References Cited

U.S. PATENT DOCUMENTS

| 3,041,976 | A | * | 7/1962 | Maynard | ............... H02K 5/128 239/17 |
| 3,228,242 | A | * | 1/1966 | Williams | ............ F04D 15/0088 73/168 |
| 4,808,087 | A | * | 2/1989 | Tsutsui | .................. F04D 13/064 417/369 |
| 2006/0118278 | A1 | * | 6/2006 | Koga | .................... F04D 29/588 165/104.28 |
| 2014/0334921 | A1 | * | 11/2014 | Park | ..................... F04D 29/586 415/175 |

FOREIGN PATENT DOCUMENTS

| CN | 2664197 Y | 12/2004 |
| CN | 200968802 Y | 10/2007 |
| CN | 201717092 U | 1/2011 |
| CN | 102033589 A | 4/2011 |
| CN | 201963386 U | 9/2011 |
| JP | 2005273617 A | 10/2005 |
| JP | 2005315159 A | 11/2005 |
| JP | 2006070816 A | 3/2006 |
| JP | 2012047179 A | 3/2012 |

OTHER PUBLICATIONS

Korean Notice of Allowance Issued Aug. 21, 2014; Appln. No. 10-2013-0053396.
First Chinese Office Action Issuing Date: Apr. 5, 2016; Appl. No. 201310451136.X.

* cited by examiner

*Primary Examiner* — Hoang Nguyen
(74) *Attorney, Agent, or Firm* — Ladas & Parry LLP

(57) ABSTRACT

A pump for a water cooler is positioned inside or outside an electronic device having heating parts in order to cool heat generated by the heating parts via a circulating refrigerant.

17 Claims, 5 Drawing Sheets

PUMP FOR WATER COOLER

CROSS-REFERENCE TO RELATED PATENT APPLICATION

This application claims the benefit of Korean Patent Application No. 10-2013-0053396, filed on May 10, 2013, in the Korean Intellectual Property Office, the disclosure of which is incorporated herein in its entirety by reference.

BACKGROUND OF THE INVENTION

1. Field of the Invention

The present invention relates to a pump for a water cooler, and more particularly, to a pump for a water cooler that is positioned inside or outside an electronic device having heating parts in order to cool heat generated by the heating parts via a circulating refrigerant.

2. Description of the Related Art

In general, a water cooler is an apparatus that cools a heating part that is installed inside an electronic device, such as a computer, and generates heat when it operates, i.e., a heating part such as a central processing unit (CPU), a chipset, random access memory (RAM), or a field effect transistor (FET), by using water or a refrigerant (a cooling fluid) including a chemical component such as an anticorrosive agent. The water cooler generally includes a water block, a radiator, a fan, a pump, a water tank, a controller, etc.

A lower surface of the water block contacts an upper surface of the heating part, and thus, the water block receives heat generated from the heating part to exchange heat with the refrigerant. Also, the radiator receives heat from the refrigerant and diffuses the heat to the outside to cool the heating part. The pump circulates the refrigerant filled in the water tank, the radiator, and a pipe. The fan passes air through the radiator for proper cooling. The controller controls operations of the fan, the pump, etc.

The above-described information regarding the related art has been acquired by the present inventor in the process of deriving the present invention. Therefore, the related art may not be regarded as a well-known technology that has been opened to the public before the present invention has been used.

SUMMARY OF THE INVENTION

The present invention provides a pump for a water cooler that cools heat generated by a heating part via a refrigerant such as circulating water.

According to an aspect of the present invention, there is provided a pump for a water cooler, including: a pump chamber assembly which includes a pump chamber wherein an impeller is disposed to rotate in a predetermined axis direction in the pump chamber to circulate a fluid therein; a heat exchange chamber assembly which comprises a heat exchange chamber that is formed on a side of the pump chamber assembly so that at least a portion of a side of the heat exchange chamber contacts the pump chamber assembly and at least a portion of an other side of the heat exchange chamber contacts a heating part, an inlet into which the fluid flows from the pump chamber assembly, and an outlet from which the fluid is discharged to the pump chamber assembly, and the fluid circulating in the heat exchange chamber; and a stator assembly which is formed on a side of the pump chamber assembly to provide a predetermined driving force to the impeller.

The pump chamber assembly and the heat exchange chamber assembly may be formed as additional assemblies that are separated from each other.

A lower surface of the pump chamber assembly and an upper surface of the heat exchange chamber assembly may be tightly combined with each other.

The pump chamber assembly and the heat exchange chamber assembly may be stacked in an axis direction of the impeller.

The pump chamber assembly may include a pump chamber upper cover and a pump chamber lower cover. The pump chamber may be formed in the pump chamber upper cover and the pump chamber lower cover that are combined with each other, the pump chamber upper cover may include: a upper inlet part into which the fluid flows from a radiator; and an outlet part from which the fluid is discharged to the radiator, and the pump chamber lower cover may include: a lower inlet part which is connected to the upper inlet part of the pump chamber upper cover and an inlet of the heat exchange chamber assembly; and an inlet hole which is connected to the outlet of the heat exchange chamber assembly.

The impeller and the stator assembly may be separated from each other through the pump chamber upper cover.

The pump chamber lower cover may include an impeller fixing part into which the impeller is inserted. One or more inlet holes may be formed in at least one side of the impeller fixing part.

The heat exchange chamber assembly may include a heat exchange chamber upper cover and a heat exchange chamber lower cover. The heat exchange chamber may be formed in the heat exchange chamber upper cover and the heat exchange chamber lower cover that are combined with each other, and the heat exchange chamber upper cover may include the inlet and the outlet.

A radiating part may be further formed on a surface of the heat exchange chamber lower cover opposite to a surface of the heat exchange chamber lower cover contacting the heating part.

The heat exchange chamber assembly may further include a first guide part that guides a moving path of the fluid that flows into the heat exchange chamber through the inlet.

The first guide part may include: an edge part which has a ring shape; and a guide part which extends from the edge part and in which a first guide hole is formed.

The guide part of the first guide part may be connected to the inlet and is disposed across the radiating part.

The pump may further include: a second guide part which is formed between the first guide part and the heat exchange chamber lower cover to cover the radiating part and comprises a second guide hole that is formed inside the second guide part to have a shape corresponding to the first guide part.

The fluid in the heat exchange chamber may be discharged outside the pump through the pump chamber as the impeller rotates.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
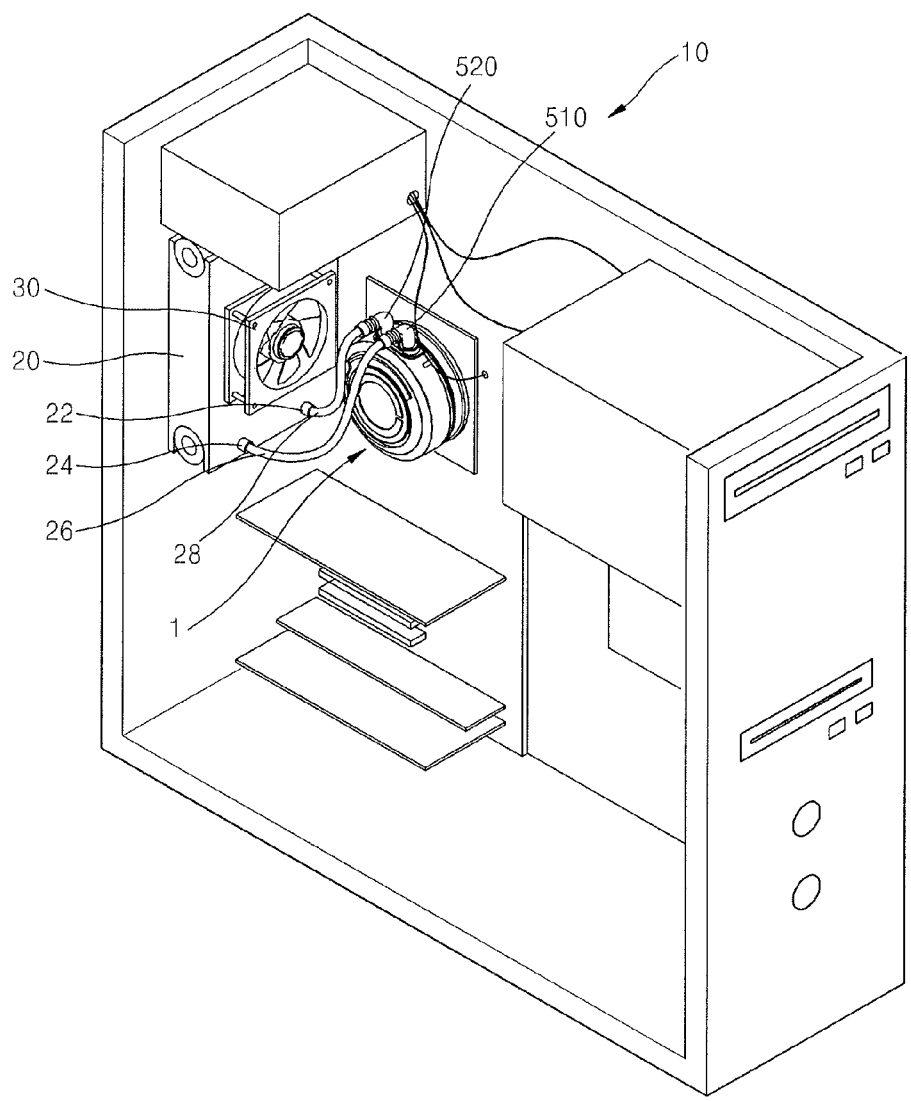
FIG. 1 is a view illustrating a pump for a water cooler that is installed in a computer mainframe according to an exemplary embodiment of the present invention.

Various example embodiments will now be described more fully with reference to the accompanying drawings in which some example embodiments are shown. In the drawings, the thicknesses of layers and regions are exaggerated for clarity.

Detailed illustrative example embodiments are disclosed herein. However, the specific structural and functional details disclosed herein are merely representative for purposes of describing the example embodiments. This invention may, however, be embodied in many alternate forms and should not be construed as limited to only the example embodiments set forth herein. Accordingly, while example embodiments are capable of various modifications and alternative forms, embodiments thereof are shown by way of example in the drawings and will herein be described in detail. It should be understood, however, that there is no intent to limit the example embodiments to the particular forms disclosed, but on the contrary, the example embodiments are to cover all modifications, equivalents, and alternatives falling within the scope of the invention. Like numbers refer to like elements throughout the description of the figures.

Hereinafter, the present invention will be described in detail by explaining embodiments of the invention with reference to the attached drawings.

FIG. 1 is a view illustrating a pump 1 for a water cooler, wherein the pump 1 is installed in a computer mainframe 10 according to an exemplary embodiment of the present invention. Referring to FIG. 1, the pump 1 according to the present exemplary embodiment is an apparatus that cools heat of a heating part that is installed in an electronic device, for example, a computer, and generates heat when it operates, by using a liquid refrigerant. The computer includes a central processing unit (CPU), a main chipset installed in a graphic card, a random access memory (RAM), etc., as heating parts.

As shown in FIG. 1, a water cooling system includes the pump 1 according to the present exemplary embodiment and a radiator 20. The pump 1 is installed in a heating part, such as the CPU, and passes a fluid such as cooled water to cool heat generated from the heating part. The radiator 20 receives the heat generated from the heating part through the pump 1 to cool heated water. The pump 1 is installed on an upper surface of the heating part such as the CPU, and the radiator 20 is installed on an inner side of the computer mainframe 10 or may be installed inside a back surface of the computer mainframe 10. A cooling fan 30 may be installed in front of or in the rear of the radiator 20 to cool water that passes through the radiator 20. Although not shown in the drawings, the radiator 20 may be installed outside the computer mainframe 10.

The pump 1 includes a heat exchange chamber assembly 400 and a pump chamber assembly 300. The heat exchange chamber assembly 400 is installed on an upper surface of the CPU and passes cooled water. The pump chamber assembly 300 passes through the heat exchange chamber assembly 400, receives heat from the CPU, pumps up heated water through a rotation force of an impeller, and discharges the cooled water to the radiator 20. In the pump 1 according to the present exemplary embodiment, the pump chamber assembly 300 and the heat exchange chamber assembly 400 are formed as additional assemblies that are separated from each other. Also, the pump chamber assembly 300 and the heat exchange chamber assembly 400 are stacked toward an axis direction of an impeller 320. This will be described in more detail later with reference to FIGS. 2 through 5.

First and second tubes 26 and 28 are installed between the pump 1 and the radiator 20 to connect the pump 1 and the radiator 20 to each other in order to circulate water and the cooling fluid that have passed through the pump 1. Therefore, water cooled through the radiator 20 is discharged through the first tube 20 to flow into the pump 1. Also, water is heated by absorbing heat of the CPU through the pump 1 flows into the radiator 20 through the second tube 28. In other words, water discharged from an outlet 24 of the radiator 20 through the first tube 26 flows into the pump 1 through an inlet 510 of the pump 1. Also, water which has absorbed heat is discharged through an outlet pipe 520 of the pump 1 to flow into an inlet 22 of the radiator 20 through the second tube 28.

The radiator 20 circulates water, a temperature of which has risen through the pump 1, to cool the water through an operation of the cooling fan 30. The cooling fan 30 may be installed in front of the radiator 20 to circulate inner air in the computer mainframe 10. Alternatively, the cooling fan 30 may be installed in the rear of the radiator 20, and a plurality of holes may be formed in a back surface of the computer mainframe 10 so that the cooling fan 30 circulates external air, thereby improving the cooling efficiency of the radiator 20. In other words, a position of the cooling fan 30 may be freely changed according to a situation of the water cooling system.

The pump 1 for a water cooler according to an exemplary embodiment of the present invention will now be described in more detail.

Figure 2:
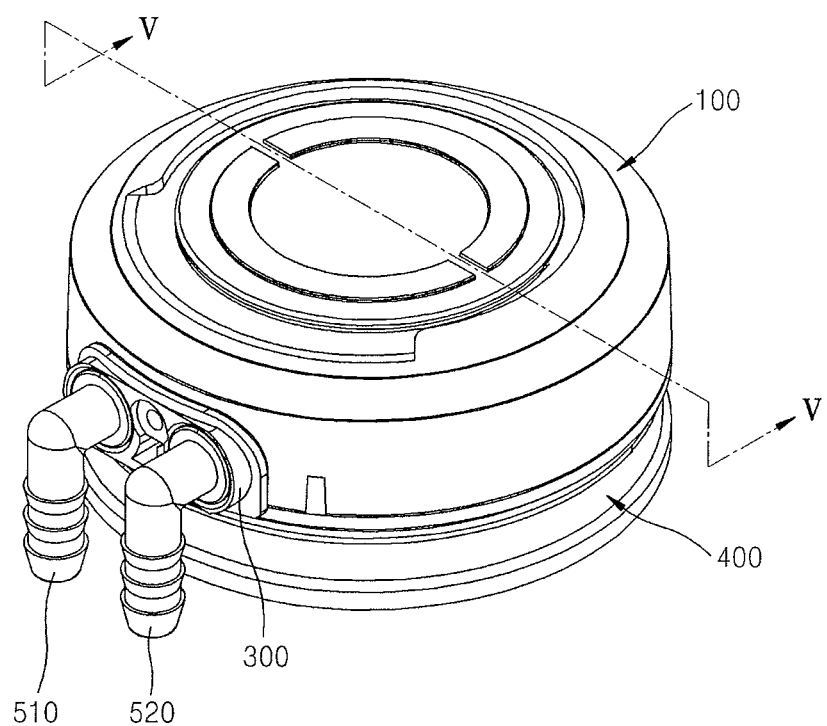
FIG. 2 is a perspective view illustrating a pump for a water cooler according to an exemplary embodiment of the present invention.
Figure 3:
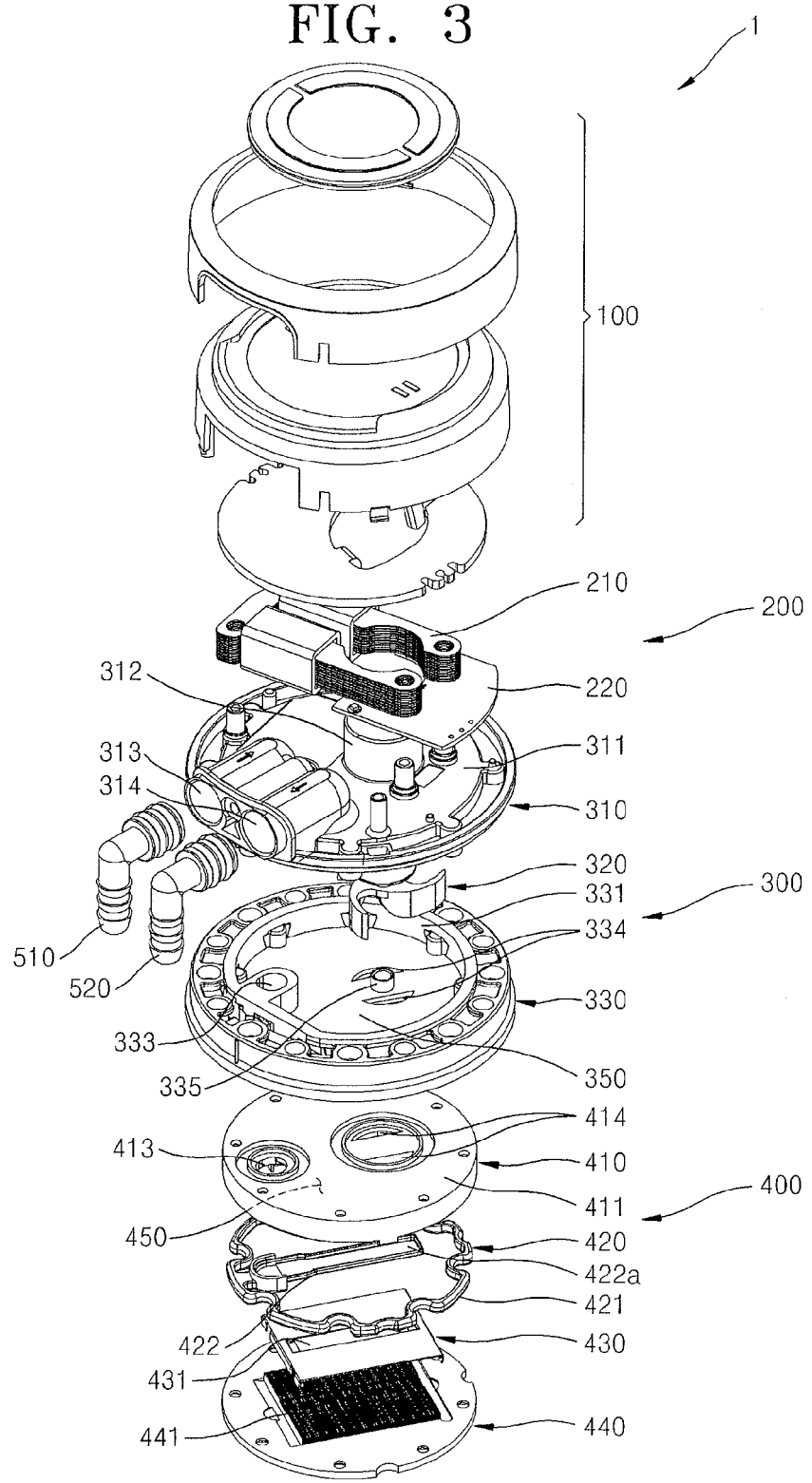
FIG. 3 is an exploded perspective view illustrating the pump for a water cooler of FIG. 2.
Figure 4:
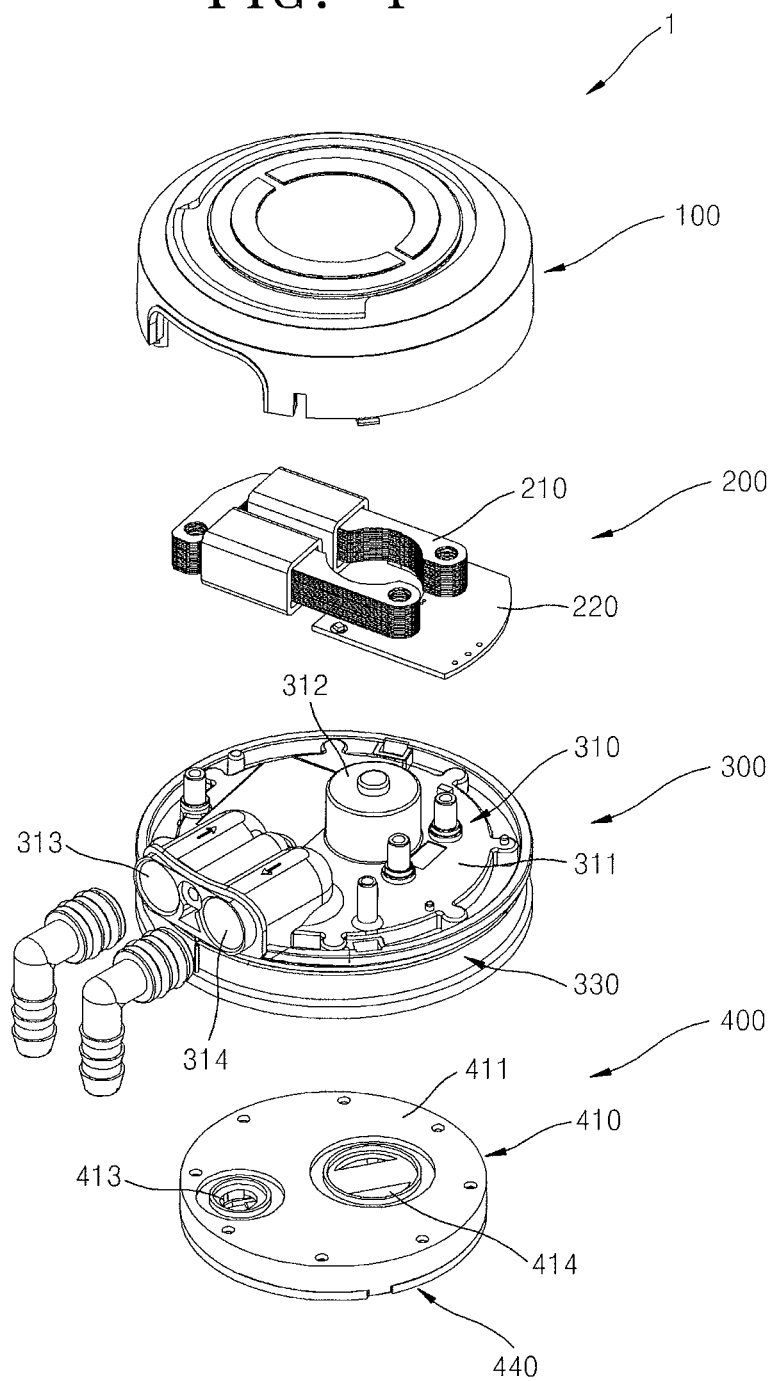
FIG. 4 is an exploded perspective view illustrating the pump for a water cooler of FIG. 2, showing each assembly of the pump for a water cooler.
Figure 5:
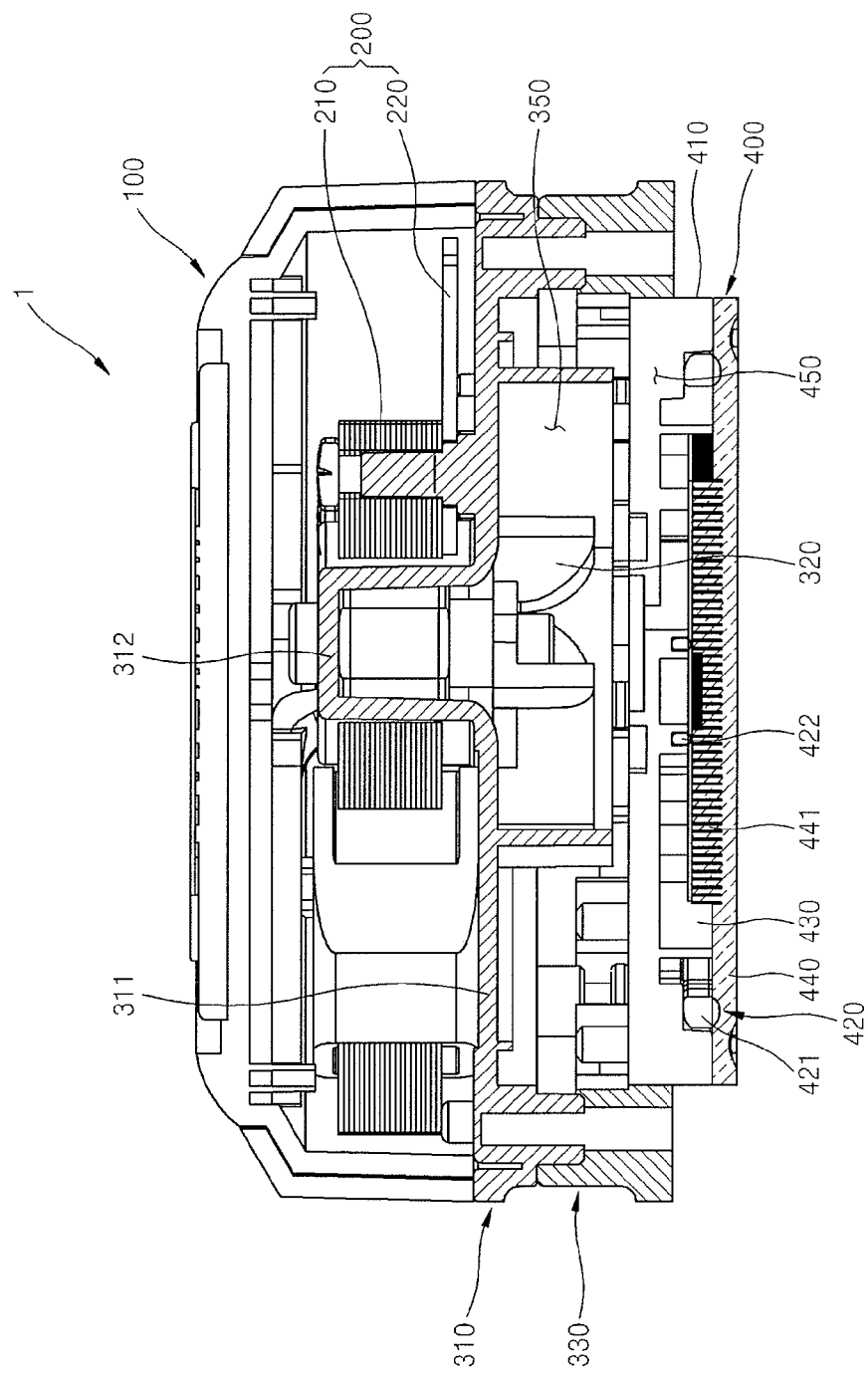
FIG. 5 is a cross-sectional view taken along line V-V of FIG. 2.

FIG. 2 is a perspective view illustrating a pump 1 for a water cooler according to an exemplary embodiment of the present invention. FIG. 3 is an exploded perspective view illustrating the pump 1 for a water cooler of FIG. 2. FIG. 4 is an exploded perspective view illustrating the pump 1 for a water cooler of FIG. 2, showing that is disassembled according to each assembly. FIG. 5 is a cross-sectional view taken along line V-V of FIG. 2.

Referring to FIGS. 2 through 5, the pump 1 according to the present exemplary embodiment includes a cover assembly 100, a stator assembly 200, a pump chamber assembly 300, and a heat exchange chamber assembly 400. In the pump 1 according to the present exemplary embodiment, a pump chamber 350 and a heat exchange chamber 450 are formed as additional assemblies that are separated from each other. Also, the pump chamber 350 and the heat exchange chamber 450 are stacked in an axis direction of the impeller 320 to be tightly combined with each other. This will now be described in more detail.

The cover assembly 100 forms an upper cover of the pump 1 to cover the stator assembly 200 and the pump chamber assembly 300.

The stator assembly 200 is disposed inside the cover assembly 100 and combined with an upper surface of the pump chamber assembly 300. The stator assembly 200 includes a stator 210 and a printed circuit board (PCB) 220. The stator 210 is formed of a part that is fixed to a motor, a generator, or the like, i.e., a metal pin supporting a coil, and a frame to which the metal pin adheres. The stator 210 rotates the impeller 320 that will be described later. The PCB 220 inputs and/or outputs predetermined power and a control signal to the stator 210.

The pump chamber assembly 300 includes a pump chamber upper cover 310, a pump chamber lower cover 330, and the impeller 320. The pump chamber 350 is formed between the pump chamber upper cover 310 and the pump chamber lower cover 330. The pump chamber assembly 300 is formed on the heat exchange chamber assembly 400, conveys water conveyed from the radiator 20 of FIG. 1 to the heat exchange chamber assembly 400, and discharges water, which has passed through the heat exchange chamber assembly 400, to the radiator 20 of FIG. 1.

The pump chamber upper cover 310 forms an upper part of the pump chamber assembly 300. The pump chamber upper cover 310 includes a body part 311 which has a flat plate shape, a stator fixing part 312 which is formed on the body part 311 to protrude from the body part 311 and into which the stator 210 is inserted, an upper inlet part 313 into which water flows from the radiator 20 of FIG. 1, and an outlet part 314 which discharges water to the radiator 20 of FIG. 1. An end of the upper inlet part 313 is connected to an inlet pipe 510, and other end of the upper inlet part 313 is connected to a lower inlet part 333 of the pump chamber lower cover 330. An end of the outlet part 314 is connected to an outlet pipe 520, and other end of the outlet part 314 is connected to an inlet hole 334 of the pump chamber lower cover 330.

The pump chamber lower cover 330 forms a lower part of the pump chamber assembly 300. The pump chamber lower cover 330 includes a body part 331 which forms a base, an impeller fixing part 335 which is formed on a bottom of the body part 331 to protrude from the bottom of the body part 331 and into which the impeller 320 is inserted, a lower inlet part 333 into which water flows from the pump chamber upper cover 310, and the inlet hole 334 into which water flows from the heat exchange chamber upper cover 410. The lower inlet part 333 is formed to penetrate the body part 331, an end of the lower inlet part 333 is connected to the upper inlet part 313 of the pump chamber upper cover 310, and other end of the lower inlet part 333 is connected to an inlet 413 of the heat exchange chamber upper cover 410. The inlet hole 334 is also formed to penetrate the body part 331 and connected to an outlet 414 of the heat exchange chamber upper cover 410.

An inside of the body part 331 of the pump chamber lower cover 330 is concave to some degree, and thus, water discharged from the heat exchange chamber assembly 400 stays inside the body part 331. Also, the body part 331 of the pump chamber lower cover 330 forms the pump chamber 350 that houses the impeller 320. In other words, the pump chamber 350 is formed in an internal space where the pump chamber upper cover 310 and the pump chamber lower cover 330 are combined with each other, and the impeller 320 is installed in the internal space.

The impeller 320 is disposed in the pump chamber 350 and discharges water from the heat exchange chamber assembly 400 to the radiator 20 of FIG. 1. For this purpose, the impeller 320 may include a plurality of rotary blades. The impeller 320 receives electric power from the stator 210 to rotate. In other words, the impeller 320 operates as a rotator corresponding to the stator 210. Detailed descriptions of detailed structures of the stator 210 and the impeller 320 are omitted herein.

The heat exchange chamber assembly 400 includes the heat exchange chamber upper cover 410, a heat exchange chamber lower cover 440, a first guide part 420, and a second guide part 430. The heat exchange chamber 450 is formed between the heat exchange chamber upper cover 410 and the heat exchange chamber lower cover 440. In other words, the heat exchange chamber assembly 400 is installed on a heating part (not shown) to receive through the pump chamber assembly 300 a cooling fluid which is cooled in the radiator 20 of FIG. 1 and then discharged from the radiator 20. Also, the heat exchange chamber assembly 400 passes the cooling fluid to cool the heating part and re-discharges water which is heated by heat received from the heating part to the radiator 20 of FIG. 1 through the pump chamber assembly 300.

The heat exchange chamber upper cover 410 forms an upper part of the heat exchange chamber assembly 400. The heat exchange chamber upper cover 410 includes a body part 411 which forms a base, an inlet 413 into which water flows from the pump chamber lower cover 330, and an outlet 414 from which water is discharged to the pump chamber lower cover 330. The inlet 413 is connected to the lower inlet part 333 of the pump chamber lower cover 330. The outlet 414 is connected to the inlet hole 334 of the pump chamber lower cover 330.

An inside of the body part 411 of the heat exchange chamber upper cover 410 is concave to some degree, and thus, the cooling fluid conveyed from the radiator 20 of FIG. 1 stays in the inside of the body part 411. The body part 411 of the heat exchange chamber upper cover 410 forms the heat exchange chamber 450 that exchanges heat with the heating part. In other words, the heat exchange chamber 450 is formed in an internal space where the heat exchange chamber upper cover 410 and the heat exchange chamber lower cover 440 are combined with each other.

The heat exchange chamber lower cover 440 forms a lower part of the heat exchange chamber assembly 400. A radiation part 441, such as a radiation pin, may be further formed on an upper surface of the heat exchange chamber lower cover 440, a lower surface of which directly contacts the heating part, to increase the efficiency of heat radiation.

The heat exchange chamber assembly 400 may be manufactured from an aluminum (Al) or copper (Cu) material having high heat conductivity and heat exchange rate.

The first and second guide parts 420 and 430 may be further formed in the heat exchange chamber 450. The first and second guide parts 420 and 430 guide a flow path of water that flows into the heat exchange chamber 450 through the inlet 413 of the heat exchange chamber upper cover 410.

In more detail, water that flows into the heat exchange chamber 450 through the inlet 413 is wholly diffused in the radiating part 441, thereby improving the heat exchange efficiency. Therefore, the first and second guide parts 420 and 430 are formed at a part contacting the inlet 413 to guide a flow path of water that flows into the heat exchange chamber 450 through the inlet 413 so that the water flows along a center of the radiating part 441 to be evenly diffused on a whole surface of the radiating part 441. Therefore, the cooling fluid flowing into the heat exchange chamber 450 is diffused through the radiating part 441 formed inside the heat exchange chamber assembly 400 so as to maximize the heat exchange efficiency. As described above, the heat conductivity and heat exchange efficiency of the heat exchange chamber assembly 400 are improved, so that the cooling fluid passing through the heat exchange chamber assembly 400 effectively receives heat of the heating part. Therefore, temperatures of the cooling fluid and the heating part are approximately balanced with each other. Therefore, a cooling effect of the heating part may be maximized.

The first guide part 420 may be formed of an elastic material such as rubber or silicon. The first guide part 420 includes an edge part 421 that has a ring shape and a guide part 422 that protrudes from the edge part 421 to an inside to guide a moving path of the cooling fluid. A first guide hole 422a is formed inside the guide part 422 to guide the cooling fluid that flows in through the inlet 413.

The second guide part 430 is formed in an approximately flat rectangular shape to cover the radiating part 441, and a second guide hole 431 is formed in a center of the second guide part 430 to correspond to the first guide hole 422a.

A cooling process of the pump 1 for the water cooler according to an exemplary embodiment of the present invention will now be described in detail.

The cooling fluid cooled in the radiator 20 of FIG. 1 flows into the heat exchange chamber assembly 400 through the inlet pipe 510 to cool the heating part (for example, the CPU, the chipset, the RAM, or the like) disposed under the heat exchange chamber assembly 400. Water that has passed through the heat exchange chamber assembly 400 moves to the pump chamber assembly 300 by the impeller 320 and then is discharged to the radiator 20 of FIG. 1 through the outlet pipe 520.

In more detail, water that is conveyed from the radiator 20 of FIG. 1 through the inlet pipe 510 passes sequentially through the upper inlet part 313 of the pump chamber upper cover 310 of the pump chamber assembly 300 and the lower inlet part 333 of the pump chamber lower cover 330 to flow into the heat exchange chamber 450 of the heat exchange chamber assembly 400 through the inlet 413 of the heat exchange chamber upper cover 410. Water that has cooled the heating part in the heat exchange chamber 450 passes sequentially through the outlet 414 of the heat exchange chamber upper cover 410 and the inlet hole 334 of the pump chamber lower cover 330 to flow into the pump chamber 350 of the pump chamber assembly 300 and then is discharged outside the pump 1 through the outlet part 314 of the pump chamber upper cover 310 to be conveyed to the radiator 20 of FIG. 1.

As described above, a pump for a water cooler according to an exemplary embodiment of the present invention provides a higher cooling effect than an existing air cooler. Therefore, a heating part, such as a CPU or the like, may have high performance, and noise hardly occurs when the pump operates. Therefore, a work environment of a user may be considerably improved. In other words, since the pump for a water cooler performs cooling by using water, the cooling efficiency of the heating part, such as the CPU or the like, is improved. Also, the heating part, such as the CPU or the like, is cooled down to a temperature close to room temperature and thus has high performance, and a breakdown possibility of the heating part is reduced. In addition, a heat exchange pump assembly is formed of an Al or Cu material having high conductivity and heat exchange rate, and a guide part is formed inside the pump to diffuse a cooling fluid. Therefore, heat generated from a heat generator is effectively exchanged so as to maximize the cooling efficiency.

According to the present invention as described above, the cooling efficiency of an electronic device is improved, and thus, a performance of the electronic device is improved, and a breakdown possibility of the electronic device is reduced. Therefore, noise occurring in a cooling process is reduced, thereby improving the convenience of a user.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A pump for a water cooler, comprising:
   a pump chamber assembly which comprises a pump chamber wherein an impeller is disposed to rotate in a predetermined axis direction in the pump chamber to circulate a fluid therein;
   a heat exchange chamber assembly which comprises a heat exchange chamber that is formed on a side of the pump chamber assembly so that at least a portion of a side of the heat exchange chamber contacts the pump chamber assembly and at least a portion of an other side of the heat exchange chamber contacts a heating part, an inlet into which the fluid flows from the pump chamber assembly, and an outlet from which the fluid is discharged to the pump chamber assembly, and the fluid circulating in the heat exchange chamber; and
   a stator assembly which is formed on a side of the pump chamber assembly to provide a predetermined driving force to the impeller,
   wherein the pump chamber assembly comprises a pump chamber upper cover and a pump chamber lower cover,
   wherein the pump chamber is formed in the pump chamber upper cover and the pump chamber lower cover that are combined with each other, the pump chamber upper cover comprises a upper inlet part into which the fluid flows from a radiator; and an outlet part from which the fluid is discharged to the radiator, and the pump chamber lower cover comprises a lower inlet part which is connected to the upper inlet part of the pump chamber upper cover and an inlet of the heat exchange chamber assembly; and an inlet hole which is connected to the outlet of the heat exchange chamber assembly.

2. The pump of claim 1, wherein the impeller and the stator assembly are separated from each other through the pump chamber upper cover.

3. The pump of claim 1, wherein the pump chamber lower cover comprises an impeller fixing part into which the impeller is inserted,
   wherein one or more inlet holes are formed in at least one side of the impeller fixing part.

4. A pump for a water cooler, comprising:
   a pump chamber assembly which comprises a pump chamber wherein an impeller is disposed to rotate in a predetermined axis direction in the pump chamber to circulate a fluid therein;
   a heat exchange chamber assembly which comprises a heat exchange chamber that is formed on a side of the pump chamber assembly so that at least a portion of a side of the heat exchange chamber contacts the pump chamber assembly and at least a portion of an other side of the heat exchange chamber contacts a heating part, an inlet into which the fluid flows from the pump chamber assembly, and an outlet from which the fluid is discharged to the pump chamber assembly, and the fluid circulating in the heat exchanged chamber; and
   a stator assembly which is formed on a side of the pump chamber assembly to provide a predetermined driving force to the impeller, wherein the heat exchange chamber assembly comprises a heat exchange chamber upper cover and a heat exchange chamber lower cover, wherein the heat exchange chamber is formed in the heat exchange chamber upper cover and the heat exchange chamber lower cover that are combined with each other, and the heat exchange chamber upper cover comprises the inlet and the outlet.

5. The pump of claim 4, wherein a radiating part is further formed on a surface of the heat exchange chamber lower cover opposite to a surface of the heat exchange chamber lower cover contacting the heating part.

6. The pump of claim 5, wherein the heat exchange chamber assembly further comprises a first guide part that guides a moving path of the fluid that flows into the heat exchange chamber through the inlet.

7. The pump of claim 6, wherein the first guide part comprises:
an edge part which has a ring shape; and
a guide part which extends from the edge part and in which a first guide hole is formed.

8. The pump of claim 6, wherein the guide part of the first guide part is connected to the inlet and is disposed across the radiating part.

9. The pump of claim 6, further comprising:
a second guide part which is formed between the first guide part and the heat exchange chamber lower cover to cover the radiating part and comprises a second guide hole that is formed inside the second guide part to have a shape corresponding to the first guide part.

10. The pump of claim 4, wherein the fluid in the heat exchange chamber is discharged outside the pump through the pump chamber as the impeller rotates.

11. The pump of claim 4, wherein the pump chamber assembly and the heat exchange chamber assembly are formed as additional assemblies that are separated from each other.

12. The pump of claim 4, wherein a lower surface of the pump chamber assembly and an upper surface of the heat exchange chamber assembly are tightly combined with each other.

13. The pump of claim 4, wherein the pump chamber assembly and the heat exchange chamber assembly are stacked in an axis direction of the impeller.

14. The pump of claim 1, wherein the fluid in the heat exchange chamber is discharged outside the pump through the pump chamber as the impeller rotates.

15. The pump of claim 1, wherein the pump chamber assembly and the heat exchange chamber assembly are formed as additional assemblies that are separated from each other.

16. The pump of claim 1, wherein a lower surface of the pump chamber assembly and an upper surface of the heat exchange chamber assembly are tightly combined with each other.

17. The pump of claim 1, wherein the pump chamber assembly and the heat exchange chamber assembly are stacked in an axis direction of the impeller.

\* \* \* \* \*